United States Patent
Yamashita et al.

(10) Patent No.: US 11,292,459 B2
(45) Date of Patent: Apr. 5, 2022

(54) DRIVING SUPPORT DEVICE

(71) Applicant: TOYOTA JIDOSHA KABUSHIKI KAISHA, Toyota (JP)

(72) Inventors: Takaya Yamashita, Toyota-sh (JP); Yoshikatsu Oda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 16/719,552

(22) Filed: Dec. 18, 2019

(65) Prior Publication Data

US 2020/0198627 A1 Jun. 25, 2020

(30) Foreign Application Priority Data

Dec. 20, 2018 (JP) .............................. JP2018-238563

(51) Int. Cl.
*B60W 30/00* (2006.01)
*B60W 30/09* (2012.01)
(Continued)

(52) U.S. Cl.
CPC ............ *B60W 30/09* (2013.01); *B60W 10/06* (2013.01); *B60W 30/18036* (2013.01); *B60W 50/087* (2013.01); *B60W 50/14* (2013.01); *B60W 2520/28* (2013.01); *B60W 2540/10* (2013.01); *B60W 2540/12* (2013.01); *B60W 2540/16* (2013.01)

(58) Field of Classification Search
CPC ........... B60W 10/06; B60W 30/18036; B60W 50/087; B60W 50/14; B60W 2520/28; B60W 2540/10; B60W 2540/12; B60W 2540/16; B60W 50/082; B60W 2720/106; B60W 30/18009; B60W 40/00; B60W 40/10

See application file for complete search history.

(56) References Cited

U.S. PATENT DOCUMENTS 6,604,592 B2 * 8/2003 Pietsch .............. B60K 31/0008
                                                          180/168
2003/0028310 A1 * 2/2003 Schmitz ................. B60K 31/04
                                                          701/93

(Continued)

FOREIGN PATENT DOCUMENTS

| JP | 2015063229 A | * | 4/2015 |
| JP | 2015063229 A | | 4/2015 |
| JP | 2019142293 A | | 8/2019 |

*Primary Examiner* — Peter D Nolan
*Assistant Examiner* — Peter Y Ning
(74) *Attorney, Agent, or Firm* — Hunton Andrews Kurth LLP

(57) ABSTRACT

A driving support device executes a limit control to control a vehicle in such a manner that an actual acceleration of when the vehicle is being reversed does not exceed a limit acceleration during a time period from a time point that a start condition becomes satisfied to a time point that an end condition becomes satisfied. The driving support device sets a state of itself to either one of a prohibiting state in which an execution of the limit control is prohibited or an allowing state in which the execution of the limit control is allowed. The driving support device sets the state of itself to the allowing state when a failure that the driving support device cannot detect/receive a request signal occurs.

7 Claims, 8 Drawing Sheets

(51) Int. Cl.
  *B60W 10/06*   (2006.01)
  *B60W 30/18*   (2012.01)
  *B60W 50/08*   (2020.01)
  *B60W 50/14*   (2020.01)

(56) References Cited

U.S. PATENT DOCUMENTS

| | | | |
|---|---|---|---|
| 2004/0209594 A1* | 10/2004 | Naboulsi | G06F 17/00 |
| | | | 455/404.1 |
| 2006/0052926 A1* | 3/2006 | Okada | B60W 30/17 |
| | | | 701/51 |
| 2008/0083292 A1* | 4/2008 | Muta | F16H 3/66 |
| | | | 74/336 R |
| 2017/0327096 A1* | 11/2017 | Mochida | B60W 30/146 |
| 2019/0256095 A1 | 8/2019 | Takagi | |

* cited by examiner

DRIVING SUPPORT DEVICE

CROSS-REFERENCE TO RELATED APPLICATION

The present application claims priority to Japanese Patent Application No. 2018-238563 filed on Dec. 20, 2018, which is incorporated herein by reference in its entirety.

BACKGROUND

Technical Field

The present disclosure relates to a driving support device configured to control a vehicle in such a manner that an actual acceleration of the vehicle does not exceed an upper limit acceleration when the driving support device detects an erroneous operation of an accelerator by a driver of the vehicle while the vehicle is being reversed.

Related Art

There has been known a driving support device (hereinafter, referred to as "a conventional device") configured to determine that a driver of a vehicle is operating an acceleration pedal erroneously when a stepping (operating, opening) speed ωacc of the acceleration pedal is equal to or higher than a sudden stepping determination threshold ω1$th$ while the vehicle is being reversed.

When the conventional device determines that the driver is operating the acceleration pedal erroneously, the conventional device controls the vehicle in such a manner that an actual acceleration of the vehicle does not exceed an upper limit acceleration (referring to Japanese Patent Application Laid-Open 2015-63229). Such a control may be referred to as "an upper limit control" for convenience.

SUMMARY

Meanwhile, it has been turned out that there are a lot of drivers who do not want the upper limit control to be executed while the driver is operating the accelerator intentionally (that is, while the driver is not operating the accelerator erroneously).

In view of the above, the inventors has been developing a device (hereinafter, referred to as "a developing device") configured to be able to prohibit an execution of the the upper limit control when the developing device detects a manual operation of the driver to prohibit the upper limit control. The developing device sets a state of the developing device to either one of an allowing (permitting) state in which an execution of the upper limit control is allowed and a prohibiting state in which the execution of the upper limit control is prohibited, in response to a detection result of the manual operation on a predetermined switch performed by the driver.

However, for example, it is considered that the developing device has the following problems when a detection failure is occurring. The detection failure is a failure that the developing device cannot detect the driver's operation on the switch due to a communication failure between the developing device and the switch. In a case where the state of the developing device is the prohibiting state at a time point that the detection failure has occurred (hereinafter, referred to as "a failure occurring time point"), the developing device cannot change the state of the developing device to the allowing state when the driver operates the switch after the failure occurring time point. Accordingly, even if the driver operates the accelerator erroneously after the failure occurring time point, the developing device does not execute the upper limit control.

The present disclosure has been made to solve the problem described above. The present disclosure has an object to provide a driving support device for being able to execute the upper limit control when the erroneous operation on the accelerator is performed, even if the driving support device was in the prohibiting state of the upper limit control at the failure occurring time point.

A driving support device (hereinafter, referred to as "the present disclosure device") according to the present disclosure comprises:

an accelerator (22$a$) which a driver operates in order for the driver to accelerate a vehicle;

a controller (10, 20, 26, 30) configured to execute an upper limit control (Step 825) to control the vehicle in such a manner that an actual acceleration of when the vehicle is being reversed does not exceed an upper limit acceleration during a time period from a time point that a predetermined start condition becomes satisfied ("Yes" at Step 635, "Yes" at Step 640, Step 645, "Yes" at Step 655) to a time point that a predetermined end condition becomes satisfied ("No" at Step 715, "Yes" at Step 720, Step 725), the start condition being a condition which becomes satisfied when the driver performs erroneous operation on the accelerator while a shift position is being held at a reverse position so that the vehicle is reversed, the end condition being a condition which becomes satisfied when the driver ends the erroneous operation on the accelerator; and an operation switch (14) configured to transmit a request signal to the controller when the driver operates the operation switch.

Furthermore, the controller is configured to:

set a state of the controller to a prohibiting state in which an execution of the upper limit control is prohibited (Step 420), when the controller receives the request signal while the controller is in an allowing state in which the execution of the upper limit control is allowed (Xkinshi=0) ("Yes" at Step 415);

set the state of the controller to the allowing state (Step 410) when the controller receives the request signal while the controller is in the prohibiting state (Xkinshi=1) ("Yes" at Step 405); and set the state of the controller to the allowing state (Step 530, Step 560) when a failure that the controller cannot receive/detect the request signal occurs ("No" at Step 415, Step 425).

When the failure that the controller cannot receive/detect the request signal from the operation switch occurs, the controller is forced to set the state of the controller to allowing state in which the execution of the upper limit control is allowed. Accordingly, the present disclosure device can execute the upper limit control certainly, when the driver operates the accelerator erroneously (or the driver performs erroneous operation on the accelerator) even after the failure occurs.

In one embodiment of the present disclosure, when the failure occurs while the shift position is being held at the reverse position ("Yes" at Step 520) and the driver is operating the accelerator ("No" at Step 525), the controller is configured to set the state of the controller to the allowing state (Step 530) at a time point that the driver ends operating the accelerator ("Yes" at Step 550), without setting the state of the controller to the allowing state at a time point that the failure occurs.

When the failure occurs while the shift position is being held at the reverse position and the driver is operating the accelerator (for example, the driver is stepping on an acceleration pedal), the driver may be operating the accelerator while the driver is aware that the controller is in the prohibiting state. In this case, if the controller changes to the allowing state to execute the upper limit control immediately after the failure occurs, the driver is likely to feel uneasy. According to the thus configured embodiment, even if the failure occurs in the above described situation, the controller remains at the allowing state until the driver ends operating the accelerator (for example, the driver stops pressing (stops stepping on) the acceleration pedal). Accordingly, a possibility that the driver feels uneasy due to start of the upper limit control can be lowered.

In one embodiment of the present disclosure, the controller is configured to notify the driver of a change of the state of the controller from the prohibiting state to the allowing state (Step 535), when the controller sets the state of the controller to the allowing state due to an occurrence of the failure (Step 530, Step 560).

The controller notifies the driver of the change of the state of the controller to the allowing state when the controller sets the state of the controller to the allowing state due to the occurrence of the failure. Accordingly, the driver can notice that the state of the controller has been changed to the allowing state. Consequently, a possibility that the driver feels uneasy when the upper limit control is executed (after the occurrence of the failure) can be lowered.

In one embodiment of the present disclosure, when the failure occurs while the shift position is being held at a position other than the reverse position ("No" at Step 520), the controller is configured to:

set the state of the controller to the allowing state at a time point that the failure occurs (Step 560); and notify the driver of the change of the state of the controller from the prohibiting state to the allowing state (Step 575) at a time point that the shift position is changed to the reverse position ("Yes" at Step 570) after the controller sets the state of the controller to the allowing state.

The upper limit control is executed when the driver operates the accelerator erroneously while the vehicle is being reversed (that is, while the driver is holding the shift position at the reverse position). Accordingly, if the driver is notified of the change of the state of controller to the allowing state when the failure occurs while the shift position is being held at the position other than the reverse position, the driver has a possibility that the driver forgets that the controller is in the allowing state when the shift position is changed to the reverse position. In view of this, according to the thus configured embodiment, when the shift position is changed to the reverse position, the driver is notified of the change of the state of the controller to the allowing state for the first time after the failure. Therefore, the driver can notice that the state of the controller is changed to the allowing state certainly.

In one embodiment of the present disclosure, the controller is configured to determine that the start condition becomes satisfied (Step 645) when the driver starts operating the accelerator ("Yes" at Step 640) during a determination time period from a start time point to an end time point ("Yes" at Step 635), the start time point is a time point that the shift position is changed to the reverse position from a position other than the reverse position, and the end time point is a time point that a predetermined time elapses from the start time point.

Normally, the driver does not operate the accelerator during the determination time period from "the start time point that the the shift position is changed from the position other than the reverse position to the reverse position" to "the end time point that the predetermined time elapses from the start point". According to the thus configured embodiment, when the driver operates the acceleration during the determination time period, it is determined that the driver operates the accelerator erroneously (by mistake). Therefore, the present disclosure can determined that the driver operates the accelerator erroneously more certainly.

In one embodiment of the present disclosure, the controller is configured to determine that the start condition becomes satisfied (Step 645) when an operating speed of the accelerator becomes equal to or higher than a predetermined threshold speed ("Yes" at Step 655).

When the driver operates the accelerator erroneously (by mistake), the operating speed of the accelerator tends to become a relatively high. According to the thus configured embodiment, when the operating speed becomes equal to or higher than the threshold speed, it is determined that the driver operates the accelerator erroneously (by mistake). Therefore, the present disclosure device can determine that the driver operates the accelerator erroneously more certainly.

In one embodiment of the present disclosure, the controller is configured to determine that the end condition becomes satisfied (Step 725) when either one of a first condition and a second condition becomes satisfied, the first condition being a condition which becomes satisfied when the shift position is changed from the reverse position to the shift position other than the reverse position ("No" at Step 715), and the second condition being a condition which becomes satisfied when the driver ends operating the accelerator ("Yes" at Step 720).

After the driver started operating the accelerator erroneously (by mistake) while the shift position was being held at the reverse position, if the driver changes the shift position to the position other than the reverse position, the driver is likely to notice that the driver has operated the accelerator erroneously. Furthermore, when the driver becomes aware that the driver has operated the accelerator erroneously, the driver tends to stop operating the accelerator so as to end the erroneous operation. In view of the above, when the shift position is changed to the position other than the reverse position, or when the driver ends operating the accelerator, the thus configured embodiment is configured to determine that the driver ends the erroneous operation on the accelerator. Therefore, it can be determined that the driver ends the erroneous operation on the accelerator more certainly.

In the above description, in order to facilitate the understanding of the present disclosure, reference symbols used in embodiment of the present disclosure are enclosed in parentheses and are assigned to each of the constituent features of the disclosure corresponding to the embodiment. However, each of the constituent features of the disclosure is not limited to the embodiment as defined by the reference symbols. Other objects, other features, and accompanying advantages of the present disclosure can be readily understood from a description of the embodiments of the present disclosure provided referring to the accompanying drawings.

DETAIL DESCRIPTION

Figure 1:
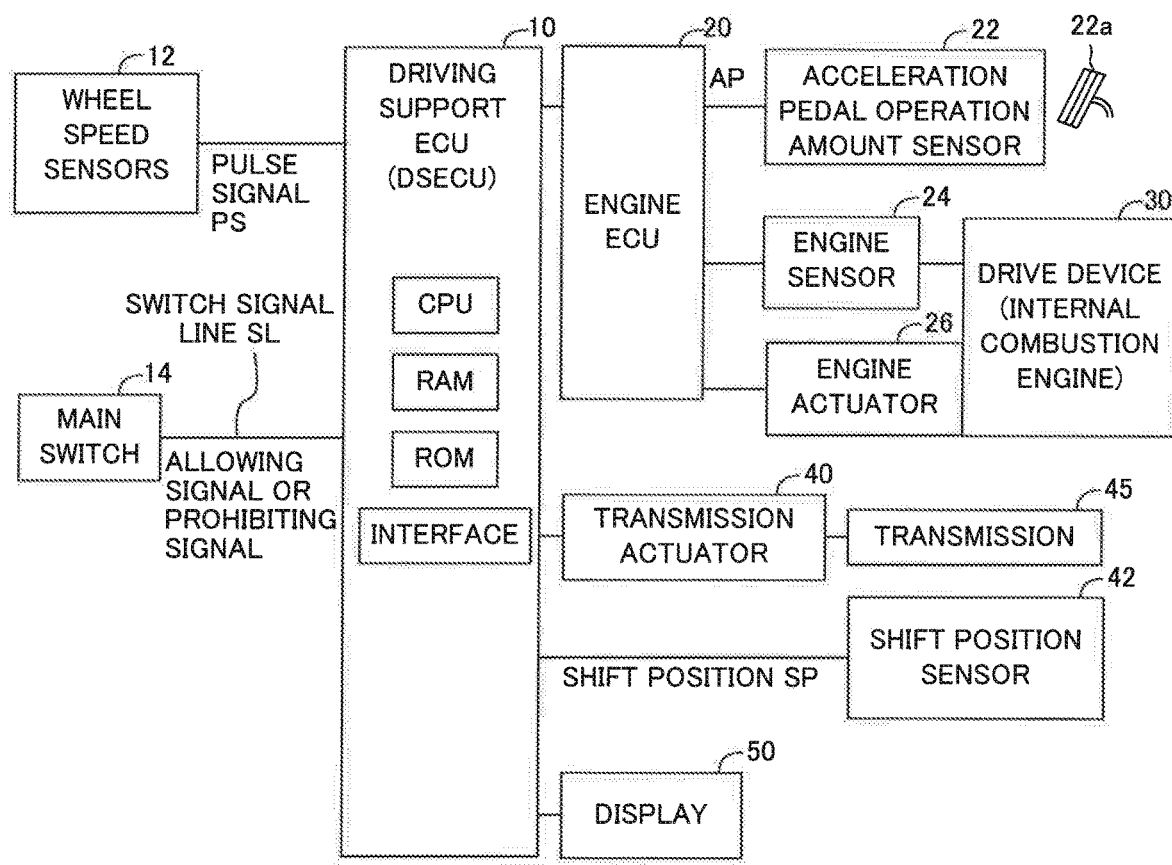
FIG. 1 is a schematic system configuration diagram of a driving support device (the present support device) according to an embodiment.
Figure 2:
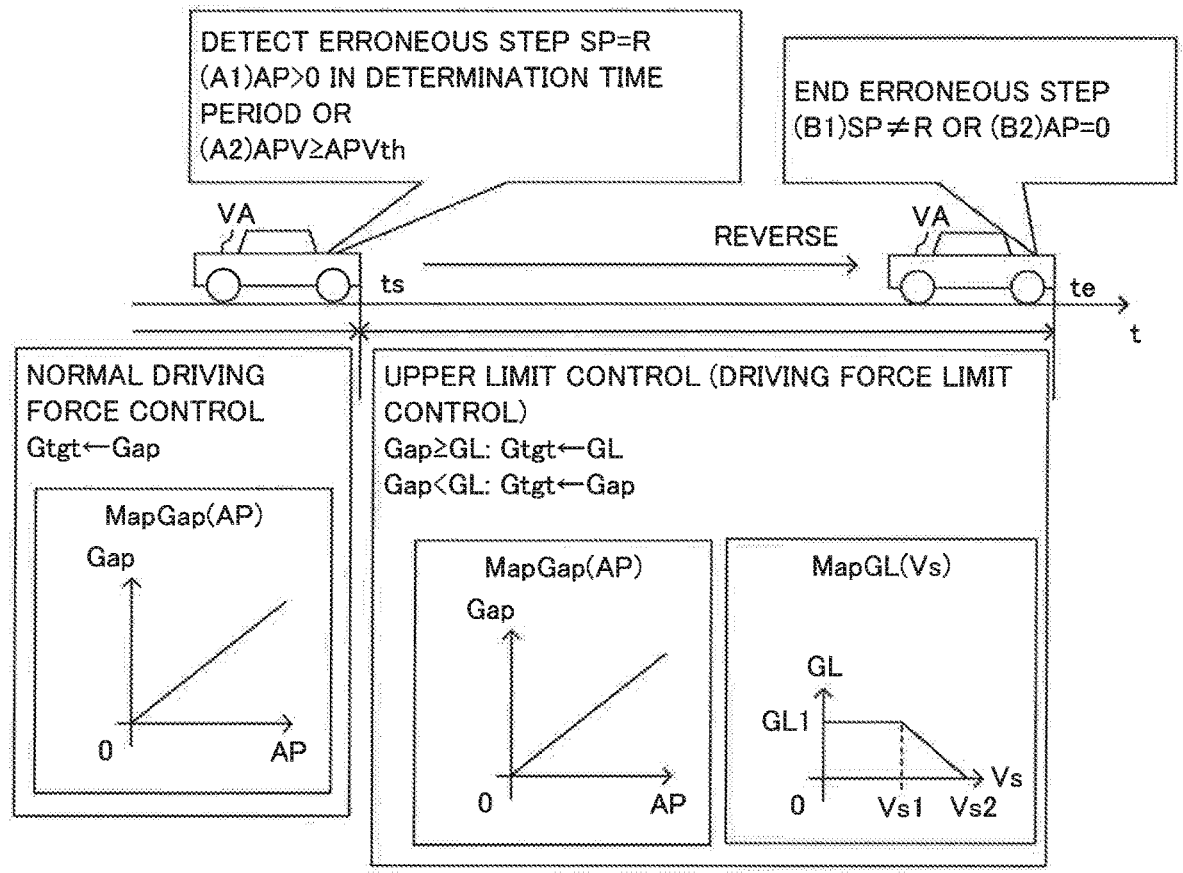
FIG. 2 is a diagram for illustrating an upper limit control.

A driving support device (hereinafter, referred to as "the present support device") according to an embodiment of the present disclosure is installed in a vehicle VA (referring to FIG. 2). The present support device comprises a driving support ECU (herein after referred to as "a DSECU") 10 and an engine ECU 20. The above ECUs are connected to each other via a controller area network (CAN) (not shown) to be able to mutually transmit and receive information to/from those ECUs.

The ECU is an abbreviation of an "Electronic Control Unit". The ECU is an electronic control circuit which includes, as a main component, a microcomputer having a CPU, a ROM, a RAM, an interface, and the like. The CPU achieves various functions through executing instructions (routines) stored in the ROM. Those ECUs may be integrated into a single ECU.

The present support device comprises a plurality of wheel speed sensors 12, a main switch (an operation switch or an operation unit) 14, an acceleration pedal operation amount sensor 22, an engine sensor 24, an engine actuator 26, a drive device (an internal combustion engine) 30, a transmission actuator 40, a shift position sensor 42, a transmission 45, and a display 50.

The wheel speed sensors 12 are provided for wheels of the vehicle VA, respectively. Each of the wheel speed sensors 12 generates one pulse signal (a wheel pulse signal), when the corresponding wheel rotates by a predetermined angle. The DSECU 10 counts the number of the pulse signals transmitted from each of the wheel speed sensors 12 for/within a predetermined time, and calculates a rotation speed (a wheel speed) of the corresponding wheel based on the counted number of the pulse signals. The DSECU 10 calculates a vehicle speed Vs indicative of a speed of the vehicle VA based on the rotation speeds of the wheels. For example, the DSECU 10 calculates the average of the rotation speeds of the four wheels as the vehicle speed Vs. The vehicle speed Vs is a positive value, and the value of the vehicle speed Vs becomes larger as a magnitude of the vehicle speed Vs becomes larger, regardless of whether the vehicle VA is traveling/running forward or backward.

The main switch 14 is a switch to be operated by the driver when the driver requests the DSECU 10 to allow an execution of an upper limit control described later or to prohibit the execution of the upper limit control. The main switch 14 is connected to the DSECU 10 via a switch signal line SL. Hereinafter, the state of the DSECU 10 in which an execution of the upper limit control is allowed is referred to as an allowing (permitting) state, and the state of the DSECU 10 in which the execution of the upper limit control is prohibited is referred to as a prohibiting state.

The position of the main switch 14 changes from an on position to an off position when the main switch 14 is operated (pressed) while the main switch 14 is held at the on position. The position of the main switch 14 changes from the off position to the on position when the main switch 14 is operated (pressed) while the main switch 14 is held at the off position. The position of the main switch 14 remains unchanged (the main switch 14 does not move), unless the main switch 14 is operated.

The main switch 14 is configured to generate a first voltage which is higher than "0" as an allowing signal while the main switch 14 is held at the off position. The allowing signal is "a signal (an allowing request signal) to indicate that the driver is requesting the DSECU 10 to allow the execution of the upper limit control (a signal indicative of an allowing request)." The main switch 14 is configured to generate a second voltage which is higher than the first voltage as a prohibiting signal when the main switch 14 is held at the on position. The prohibiting signal is "a signal (a prohibition request signal) to indicate that the driver is requesting the DSECU 10 to prohibit the execution of the upper limit control (a signal indicative of a prohibition request)." For example, the main switch 14 may be incorporated into a resistance voltage divider circuit for dividing a voltage Vb of a battery mounted on the vehicle VA using a plurality of the resistances. The resistance voltage divider circuit generates the first voltage V1 and the second voltage V2 depending the position of the main switch 14.

The engine ECU 20 is connected to the acceleration pedal sensor 22 and the engine sensor 24 to receive detection signals from these sensors.

The acceleration pedal operation amount sensor 22 acquires/measures an operation amount of an acceleration pedal 22a of the vehicle VA (that is, an acceleration pedal operation amount AP) to transmit a detection signal indicative of the acceleration pedal operation amount AP to the engine ECU 20. The acceleration pedal 22a is an operator to be operated by the driver in order for the driver to increase driving force generated by the drive device (the internal combustion engine in the present example) 30 of the vehicle VA. The acceleration pedal operation amount AP is "0" when the driver does not operate the acceleration pedal 22a (that is, when the driver does not step on the acceleration pedal 22a). The acceleration pedal operation amount AP increases as a stepping/operation amount of the acceleration pedal 22a increases. The engine ECU 20 transmits, to the DSECU 10, the detection signal which the engine ECU 20 receives from the acceleration pedal operation amount sensor 22. The DSECU 10 receives the detection signal from the engine ECU 20 so as to obtain the acceleration operation amount AP.

The engine sensors 24 measure/acquires various driving state amounts of the internal combustion engine 30. For example, the engine sensors 24 include a throttle valve opening degree sensor, an engine rotation speed sensor, and an intake air flow sensor.

Furthermore, the engine ECU 20 is connected to engine actuators 26. For example, the engine actuators 26 include a throttle valve actuator and fuel injectors. The engine ECU 20 changes torque generated by the internal combustion engine 30 through driving the engine actuator 26 to adjust/change the driving force acting on the vehicle VA.

The engine ECU 20 adjusts (increases or decreases) a target throttle valve opening degree TAtgt in such a manner that an actual acceleration Ga becomes equal to a predetermined target acceleration Gtgt. The engine ECU 20 controls the engine actuator 26 in such a manner that an actual throttle valve opening degree TA becomes equal to the target throttle valve opening degree TAtgt. The engine ECU 20 receives the detection signal indicative of the vehicle speed Vs from the DSECU 10. The engine ECU 20 calculates, as the actual acceleration Ga, a change amount of the vehicle speed Vs within a unit time (=vehicle speed at the present time point−vehicle speed at a time point before the present time point by the unit time).

Furthermore, the DSECU 10 is connected to the transmission actuator 40 and the shift position sensor 42.

The transmission actuator 40 is configured to change a transmission stage of the transmission 45 of the vehicle VA. The DSECU 10 determines the transmission stage (transmission gear ratio) based on a position (hereinafter, referred to as "a shift position SP") of an unillustrated shift lever operated by the driver, the acceleration pedal operation amount AP, and the vehicle speed Vs. Thereafter, the DSECU 10 transmits a driving signal to the transmission actuator 40 in order to achieve the determined transmission stage. For example, the DSECU 10 controls the transmission actuator 40 in such a manner that the transmission stage of the transmission 45 is set to a transmission stage to reverse the vehicle VA, when the shift position SP is changed to a reverse position (a position of a reverse range "R").

The shift position sensor 42 detects the shift position SP to transmit a signal indicative of the detected shift position SP to the DSECU 10. The shift position SP is any one of a position of a parking range "P", a position of a driving range "D", a position of a reverse range "R" (the reverse position R), and a position of a neutral range "N".

The DSECU 10 is connected to the display 50. The display 50 is a head-up display (hereinafter, referred to as "an HUD"). The display 50 (the HUD) receives a display signal from the DSECU 10 to display "display information" indicated by the display signal on a part of a windshield of the vehicle VA. The display 50 may be a liquid crystal display.

(Vehicle Control)

The support device (more specifically, the DSECU 10) determines whether or not an erroneous operation referred to as "an erroneous operation while-reversing" has occurred. The erroneous operation while-reversing occurs when the driver erroneously/mistakenly steps on (presses) greatly/deeply the acceleration pedal 22*a* while the shift position SP is held at the reverse position R. If a state of the support device is the allowing state at a time point that the support device determines that the erroneous operation while-reversing has occurred (referring to a time point ts shown in FIG. 2), the support device executes the upper limit control during a time period from the time point ts to a time point that the erroneous operation while-reversing is ended/disappears (referring to a time point to shown in FIG. 2). The upper limit control is a control to control the vehicle in such a manner that the actual acceleration of when the vehicle VA is being reversed/backed does not exceed the upper limit acceleration. The actual acceleration here means a magnitude of the acceleration of the vehicle VA. Hereinafter, the actual acceleration is referred to as "an actual acceleration Ga." The upper limit control may be referred to as "a driving force limit control."

<1. Detection/determination of Erroneous Operation While-Reversing>

The present support device determines that the driver has performed the erroneous operation while-reversing (that is, the present support device detects the erroneous operation while-reversing) when a predetermined start condition becomes satisfied (i.e., any one of the following conditions A1 and A2 becomes satisfied). That is, the present support device detects the erroneous operation while-reversing by monitoring whether the start condition becomes satisfied. The erroneous operation while-reversing is determined to be started when the start condition becomes satisfied.

A1: The acceleration pedal operation amount AP becomes larger than "0" during a determination time period from a start time point that the shift position SP is changed to the reverse position R from any one of positions other than the reverse position R to an end time point that a predetermined time elapses from the start time point.

A2: An acceleration pedal operating speed APV becomes higher than a threshold operating speed APVth when the shift position SP is held at the reverse position R. The acceleration pedal operating speed APV is an increasing rate of the acceleration pedal operating amount AP.

<2. Detection/Determination of Ending Erroneous Operation While-Reversing>

The present support device determines that the driver has ended the erroneous operation while-reversing (or the erroneous operation while-reversing has disappeared (has been terminated)) when a predetermined end condition becomes satisfied (any one of the following conditions B1 and B2 becomes satisfied) after the erroneous operation while-reversing was detected (that is, after the start condition was satisfied). The erroneous operation while-reversing is determined to be ended when the end condition becomes satisfied.

B1: The shift position SP is changed to any one of the positions other than the reverse position R.

B2: The acceleration pedal operation amount AP becomes "0" when the shift position SP is held at the reverse position R.

Accordingly, the present support device continues detecting the erroneous operation while-reversing (determining that the erroneous operation while-reversing is occurring) during a time period from a time point that at least one of the conditions A1 and A2 becomes satisfied to a time point that at least one of the conditions B1 and B2 becomes satisfied. The time period may be referred to as "an erroneous operation detecting time period".

<3. Normal Driving Force Control>

The present support device executes a normal driving force control when the present support device does not detect the erroneous operation while-reversing. In the normal driving force control, the present support device determines (acquires) an operation acceleration Gap depending on the acceleration pedal operation amount AP by applying the acceleration pedal operation amount AP to a normal acceleration map MapGap(AP) (referring to FIG. 2). Thereafter, the present support device sets the target acceleration Gtgt to the operation acceleration Gap, and transmits the target acceleration Gtgt to the engine ECU 20.

The normal acceleration map MapGap(AP) defines the operation acceleration Gap in such a manner that the operation acceleration Gap increases as the acceleration pedal operation amount AP increases. The normal acceleration map MapGap(AP) has been stored in the ROM of the DSECU 10. Other maps described later have also been stored in the ROM, similarly to the normal acceleration map MapGap(AP).

The engine ECU 20 adjusts (increases or decreases) the target throttle valve opening degree TAtgt in such a manner that the actual acceleration Ga becomes equal to the target acceleration Gtgt transmitted from the DSECU 10. The engine ECU 20 controls the engine actuator 26 in such a manner that the actual throttle valve opening degree TA becomes equal to the target throttle valve opening degree TAtgt.

<4. Upper Limit Control (Driving Force Limit Control)>

As described above, the present support device executes the upper limit control when the present support device has detected the erroneous operation while-reversing. In the upper limit control, the present support device acquires a limit acceleration (an upper limit acceleration) GL by applying the vehicle speed Vs to a limit acceleration map MapGL (Vs) (referring to FIG. 2).

The limit acceleration map MapGL(Vs) defines the limit acceleration GL in such a manner that the limit acceleration GL becomes a constant acceleration GL1 when the vehicle speed Vs is equal to or higher than "0" and smaller than "Vs1". Furthermore, the limit acceleration map MapGL(Vs) defines the limit acceleration GL in such a manner that the limit acceleration GL decreases as the vehicle speed Vs increases from "Vs1" so that the limit acceleration GL becomes "0" when the vehicle speed Vs becomes "Vs2 (>Vs1)".

Furthermore, the present support device acquires the operation acceleration Gap by applying the acceleration pedal operation amount AP to the normal acceleration map MapGap(AP), similarly to the normal driving force control.

When the operation acceleration Gap is equal to or higher than the limit acceleration GL, the present support device sets the target acceleration Gtgt to the limit acceleration GL, and transmits the target acceleration Gtgt to the engine ECU 20. When the operation acceleration Gap is lower than the limit acceleration GL, the present support device sets the target acceleration Gtgt to the operation acceleration Gap, and transmits the target acceleration Gtgt to the engine ECU 20.

In this manner, the present support device determines the limit acceleration GL which varies depending on the vehicle speed Vs while the present support device is executing the upper limit control. When the driver steps on (presses) the acceleration pedal 22a greatly due to the erroneous operation so that the operation acceleration Gap becomes equal to or higher than the limit acceleration GL, the present support device sets the target acceleration Gtgt to the limit acceleration GL. Thus, by the upper limit control, the vehicle VA is controlled in such a manner that the actual acceleration Ga does not exceed to the limit acceleration GL.

(Outline of Operation)

As described above, the driver operates can sets the state of the present support device to either the allowing state or the prohibiting state, using the operation switch 14. The DSECU 10 sets a value of a prohibition flag Xkinshi to "1" when the DSECU 10 has received the prohibiting signal from the main switch 14 (when the DSECU 10 determines that the main switch 14 has generated the prohibiting signal). The DSECU 10 sets the value of the prohibition flag Xkinshi to "0" when the DSECU 10 has received the allowing signal from the main switch 14 (when the DSECU 10 determines that the main switch 14 has generated the allowing signal). The DSECU 10 sets the prohibition flag Xkinshi to "0" through an initialization routine which the CPU executes when the driver has changed a position of an ignition key switch (now shown) of the vehicle VA from an off-position to an on-position. In a case where the value of the prohibition flag Xkinshi is "1" (that is, when a state of the DSECU 10 is the prohibiting state), the DSECU 10 does not execute the upper limit control, even if the driver performs the erroneous operation while-reversing on the acceleration pedal 22a (that is, even if the erroneous operation while-reversing is detected).

Meanwhile, a failure that the DSECU 10 cannot (fails to) detect the signal from the main switch 14 may occur. In other words, the failure that the DSECU 10 cannot (fails to) detect the operation on the main switch 14 performed by the driver may occur. Hereinafter, that failure is referred to as "a communication failure". For example, the communication failure occurs because of a disconnection of a switch signal line SL. In a case where the state of the DSECU 10 has been set to the prohibiting state when the communication failure occurs, the DSECU 10 no longer be able to set (change) the state of the DSECU 10 to the allowing state even if the driver operates the main switch 14, as long as the communication failure remains.

In view of the above, when the communication failure occurs, the DSECU 10 is forced to set the state of itself to the allowing state (that is, the DSECU 10 is forced to set the value of the prohibition flag Xkinshi to "0"), and notifies the driver of a change of the state of itself to the allowing state.

A process (failure response process) for responding to the communication failure will be described with reference to examples shown in FIGS. 3A through 3C. In the examples shown in FIGS. 3A through 3C, when the driver operates the main switch 14 at a time point t1, the DSECU 10 sets the value of the prohibition flag Xkinshi to "1". Thereafter, the communication failure occurs at a time point t2.

Figure 3A:
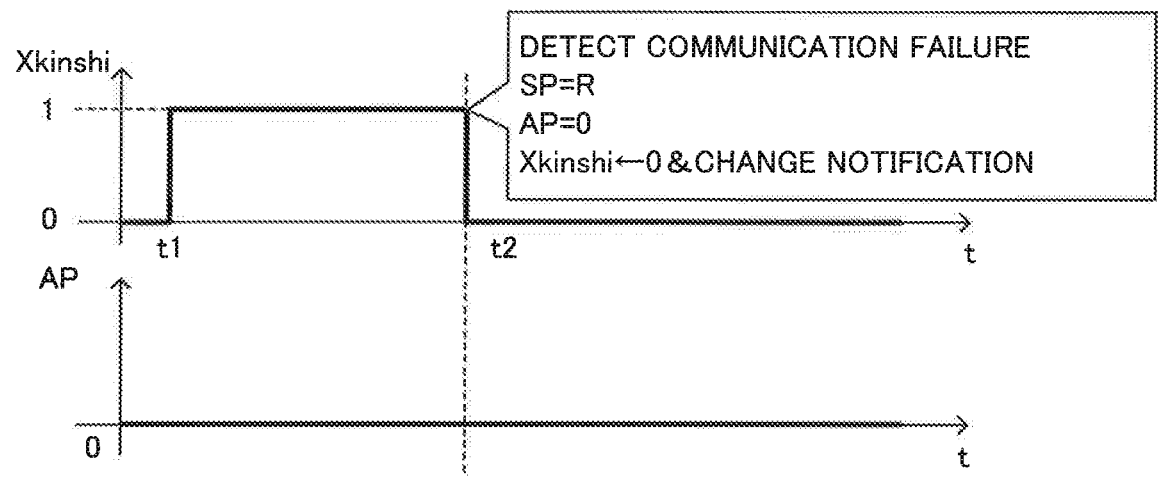
FIG. 3A is a timing chart for illustrating a failure response process while a shift position is being held at a reverse position and an acceleration pedal is not being operated.

In an example shown in FIG. 3A, at the time point t2, the acceleration operation amount AP is "0" because the driver does not step on the acceleration pedal 22a, and the shift position SP is held at the reverse position R. In this case, at the time point t2, the DSECU 10 sets the value of the prohibition flag Xkinshi to "0", and executes a change notification. In the change notification, a display element is displayed on the display 50. The display element represents that the state of the DSECU 10 has been changed to the allowing state due to an occurrence of the communication failure. When the state of the DSECU 10 is the allowing state, the DSECU 10 allows the upper limit control to be executed. As the change notification, a sound message representing the above thing may be output from a speaker (not shown), in addition to or in place of displaying the display element.

Figure 3B:
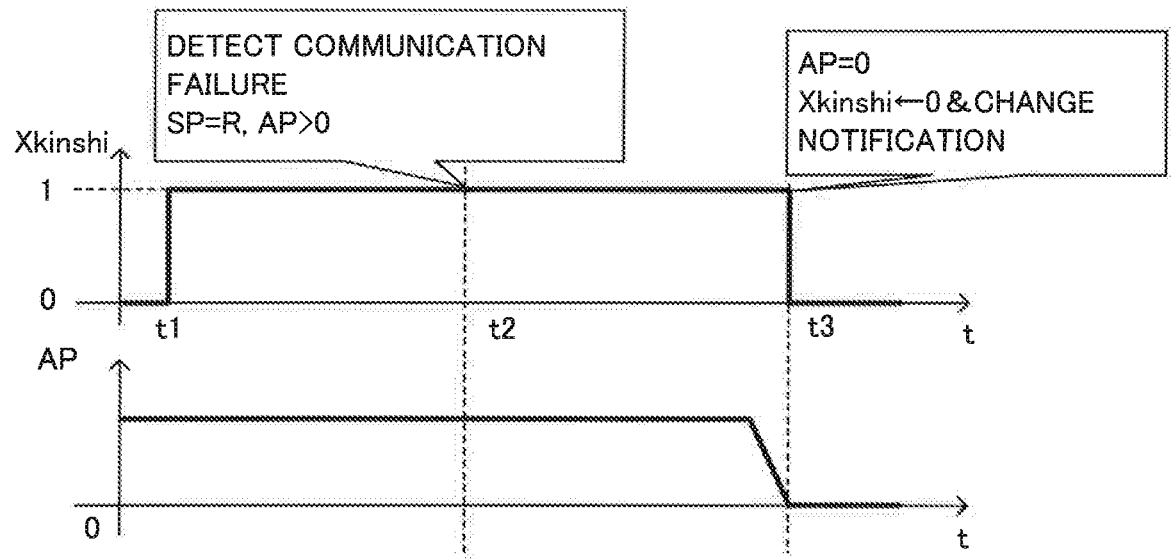
FIG. 3B is a timing chart for illustrating the failure response process while the shift position is being held at the reverse position and the acceleration pedal is being operated.

In an example shown in FIG. 3B, at the time point t2, the acceleration pedal operation amount AP is larger than "0" because the driver steps on the acceleration pedal 22a, and the shift position SP is held at the reverse position R. In this case, at the time point t2, the driver is aware that the state of the DSECU 10 is the prohibition state and is operating the acceleration pedal 22a. Accordingly, if the value of the prohibition flag Xkinshi is changed from "1" to "0" at the time point t2, the DSECU 10 may execute the upper limit control. The thus executed upper limit control is likely to have the driver feel uneasy. In view of the above, the DSECU 10 does not change the value of the prohibition flag Xkinshi to "0" at the time point t2, but changes the value of the prohibition flag Xkinshi to "0" at a time point t3 that the acceleration operation amount AP becomes "0". Furthermore, the DSECU 10 executes the change notification at the time point t3.

Figure 3C:
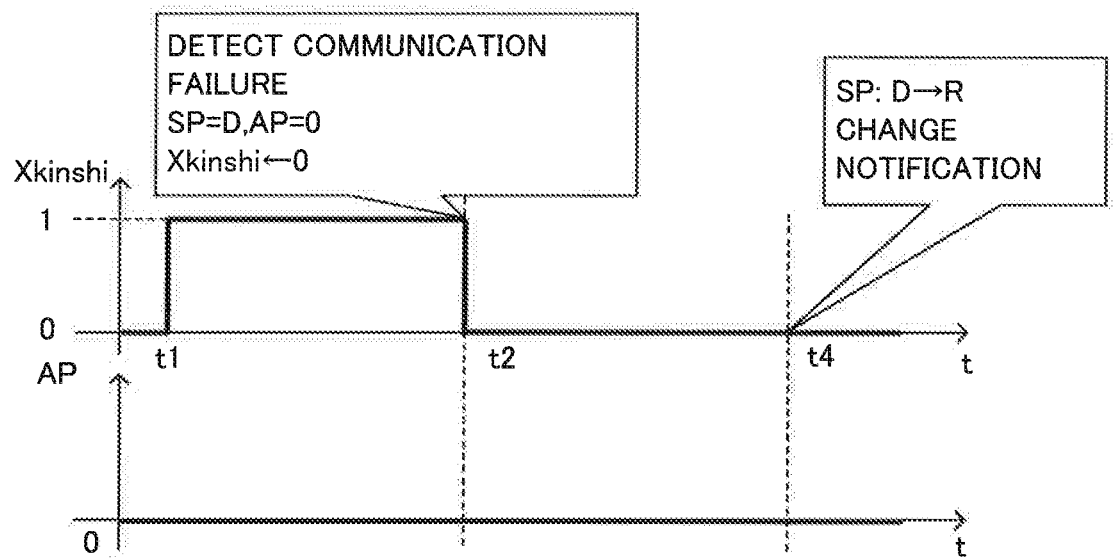
FIG. 3C is a timing chart for illustrating the failure response process while the shift position is being held at a position other than the reverse position.

In an example shown in FIG. 3C, at the time point t2, the shift position SP is held at a position (e.g., the driving position D) other than the reverse position R, and the acceleration pedal operation amount AP is "0". In this case, the DSECU 10 sets the prohibition flag Xkinshi to "0" at the time point t2. However, the DSECU 10 does not execute the change notification at the time point t2, but executes the change notification at a time point t4 that the shift position SP is changed to the reverse position R. That is, the change notification is not executed when the shift position SP is held at the position other than the reverse position R. If the change notification is executed when the shift position SP is held at the position other than the reverse position R, the driver may forget that the state of the DSECU 10 has been set to the allowing state before a time point that the shift position SP is changed to the reverse position R. When the upper limit control is executed in a situation in which the driver forgets the state of the DSECU 10, the driver may feel uneasy. Accordingly, the DSECU 10 executes the change notification at the time point t4 that the shift position SP is changed to the reverse position R.

As described above, the DSECU 10 is forced to set the value of the prohibition flag Xkinshi to "0" at an appropriate time point, in a case where the communication failure occurs. Therefore, the DSECU 10 can execute the upper limit control when the erroneous operation while-reversing is performed after the communication failure occurs.

(Specific Operation)
<Prohibition Flag Setting Routine>

The CPU of the DSECU 10 (hereinafter, the term "CPU" means the CPU of the DSECU 10 unless otherwise specified) is configured to execute a routine (a prohibition flag setting routine) represented by a flowchart shown in FIG. 4, every time a predetermined time elapses.

Figure 4:
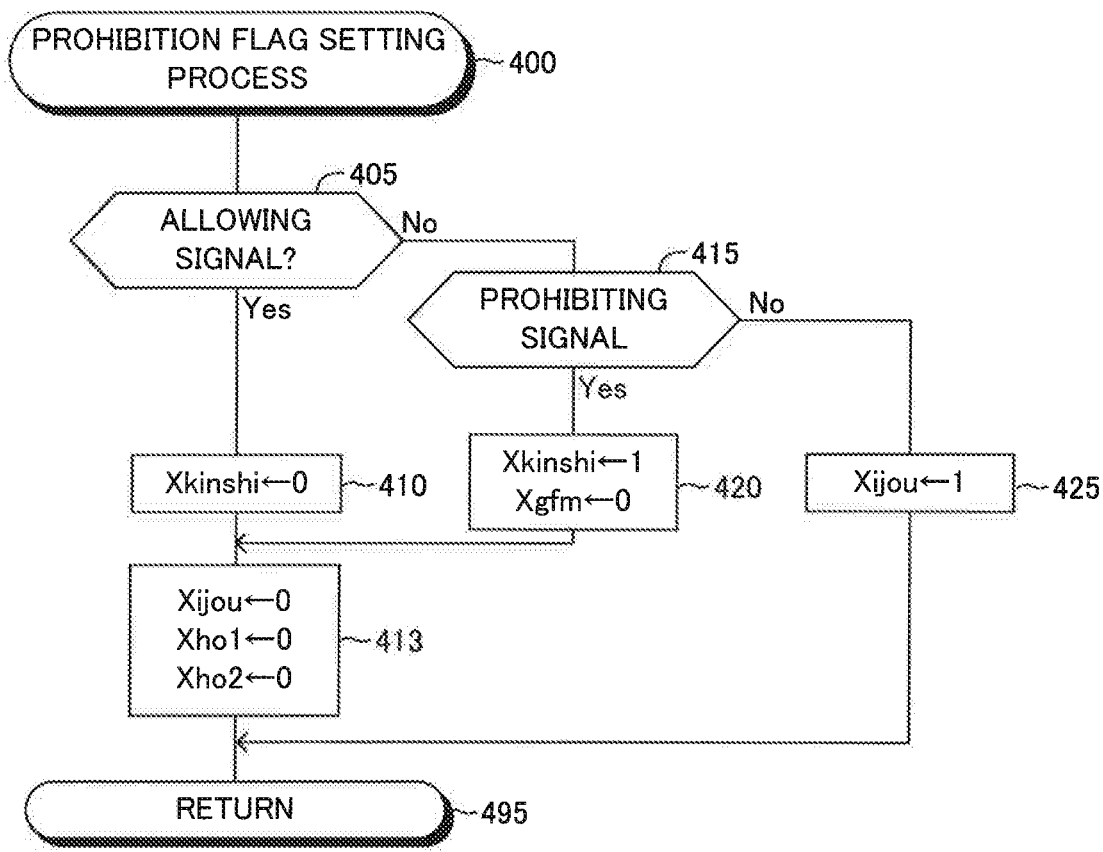
FIG. 4 is a flowchart illustrating a routine executed by a CPU of a driving support ECU illustrated in FIG. 1.

When a predetermined timing has come, the CPU starts processes from Step 400 shown in FIG. 4, and proceeds to Step 405. At Step 405, the CPU determines whether or not the main switch 14 is generating the allowing signal by determining whether or not a voltage Vm caused by the main switch 14 is equal to or higher than a first threshold voltage V1$th$ and lower than a second threshold voltage V2$th$. The first threshold voltage V1$th$ is higher than "0" and lower than the first voltage V1. The second threshold voltage V2$th$ is higher than the first voltage V1 and lower than the second voltage V2.

When the main switch 14 is generating the allowing signal (that is, V1$th$≤Vm<V2$th$), the CPU makes a "Yes" determination at Step 405, and executes Steps 410 and 413 in order.

Step 410: The CPU sets the prohibition flag Xkinshi to "0".

Step 413: The CPU sets values of a failure flag Xijou, a first holding/suspension flag Xho1, and a second holding/suspension flag Xho2, which are described later, to "0".

Thereafter, the CPU proceeds to Step 495 to tentatively terminate the present routine.

The failure flag Xijou is set to "1" at Step 425 described later, when it is determined that the communication failure has occurred (that is, when the DSECU 10 receives neither the allowing signal nor the prohibiting signal). The failure flag Xijou is set to "0" at Step 413, when the main switch 14 and the DSECU 10 can communicate with each other (that is, when the DSECU 10 receives any one of the allowing signal and the prohibiting signal). Furthermore, the failure flag Xijou is set to "0" through the above described initialization routine.

When the DSECU 10 does not receive the allowing signal, the CPU makes a "No" determination at Step 405, and proceeds to Step 415. At Step 415, the CPU determines whether or not the main switch 14 is generating the prohibiting signal by determining whether or not the voltage Vm caused by the main switch 14 is equal to or higher than the second threshold voltage V2$th$ and lower than a third threshold voltage V3$th$. The third threshold voltage V3$th$ is higher than the second voltage V2 and lower than the voltage Vb applied to the resistance voltage divider circuit into which the main switch 14 is incorporated.

When the main switch 14 is generating the prohibiting signal (that is, V2$th$≤Vm<V3$th$), the CPU makes a "Yes" determination at Step 415, and proceeds to Step 420. At Step 420, the CPU sets the value of the prohibition flag Xkinshi to "1", and sets a value of an erroneous operation flag Xgfm to "0". Thereafter, the CPU proceeds to Step 413.

When the voltage Vm caused by the main switch 14 is lower than the first threshold voltage V1$th$, or when the voltage Vm is equal to or higher than the third threshold voltage V3$th$, the CPU determines that the communication failure (due to, for example, the disconnection of the switch signal line SL or a short circuit of the switch signal line SL) has occurred. In this case, since the CPU determines that the main switch 14 is generating neither the allowing signal nor the prohibiting signal, the CPU makes a "No" determination at Step 405 and makes a "No" determination at Step 415. Thereafter, the CPU proceeds to Step 425. At Step 425, the CPU sets the failure flag Xijou to "1", and proceeds to Step 495 to tentatively terminate the present routine.

<Failure Response Process Routine>

Figure 5:
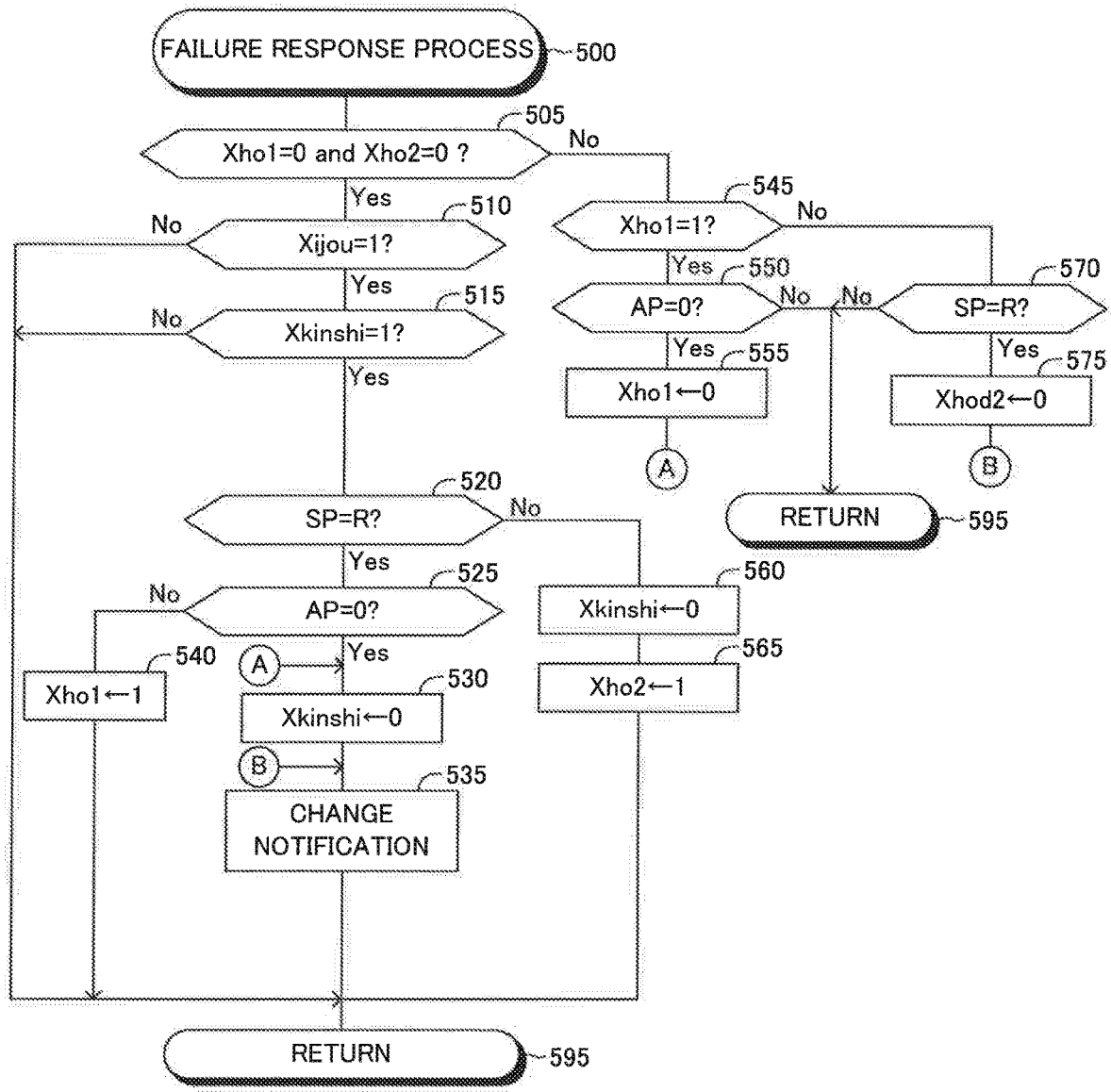
FIG. 5 is a flowchart illustrating a routine executed by the CPU of the driving support ECU illustrated in FIG. 1.

The CPU executes a failure response process routine represented by a flowchart shown in FIG. 5, every time a predetermined time elapses.

When a predetermined timing has come, the CPU starts processes from Step 500 shown in FIG. 5, and proceeds to Step 505 to determine whether or not both of the value of the first holding flag Xho1 and the value of the second holding flag Xho2 are "0". The value of the first holding flag Xho1 is set to "1" at step 540 described later. The value of the first holding flag Xho1 is set to "0" at Step 413 described above or at Step 555 described later. Furthermore, the value of the first holding flag Xho1 is set to "0" through the above described initialization routine. The value of the second holding flag Xho2 is set to "1" at Step 565 described later. The value of the second holding flag Xho2 is set to "0" at Step 413 described above or Step 575 described later. Furthermore, the value of the second suspension flga Xho2 is set to "0" through the above described initialization routine.

When both of the value of the first holding flag Xho1 and the value of the second holding flag Xho2 are "0", the CPU makes a "Yes" determination at Step 505, and proceeds to Step 510. At Step 510, the CPU determines whether or not the value of the failure flag Xijou is "1". When the value of the failure flag Xijou is "0" (that is, when the communication failure is not determined to have been occurring), the CPU makes a "No" determination at Step 510, and proceeds to Step 595 to tentatively terminate the present routine.

When the CPU proceeds to Step 510, the CPU makes a "Yes" determination at Step 510 to proceed to Step 515, if the value of the failure flag Xijou is "1" (that is, when the communication failure is determined to have been occurring).

At Step 515, the CPU determines whether or not the value of the prohibition flag is "1". When the value of the prohibition flag Xkinshi is "0" (that is, when the state of the DSECU 10 is the allowing state), the DSECU 10 needs neither to set the value of the prohibition flag Xkinshi to "0" nor to notify the driver of changing the value of the prohibition flag Xkinshi to "0", even if the communication failure has been occurring. Accordingly, the CPU makes a "No" determination at Step 515, and proceeds to Step 595 to tentatively terminate the present routine.

When the CPU proceeds to Step 515, the CPU makes a "Yes" determination at Step 515, and proceeds to Strep 520, if the value of the prohibition flag Xkinshi is "1" (that is, when the state of the DSECU 10 is the prohibiting state).

At Step 520, the CPU determines whether or not the shift position SP is held at the reverse position R. When the shift position SP is held at the reverse position R, the CPU makes a "Yes" determination at Step 520, and proceeds to Step 525.

At Step 525, the CPU determines whether or not the acceleration pedal operation amount AP is "0". The CPU obtains the acceleration pedal operation amount AP from the engine ECU 20. When the acceleration pedal operation amount AP is "0", the CPU makes a "Yes" determination at Step 525, and executes Steps 530 and 535 in that order. Thereafter, the CPU proceeds to Step 595 to tentatively terminate the present routine.

Step 530: The CPU sets the value of the prohibition flag Xkinshi to "0".

Step 535: The CPU executes the above described change notification.

When the CPU proceeds to Step 525, the CPU makes a "No" determination at Step 525, and proceeds to Step 540, if the acceleration pedal operation amount AP is larger than "0". At Step 540, the CPU sets the value of the first holding flag Xho1 to "1", and proceeds to Step 595 to tentatively terminate the present routine.

When the CPU proceeds to Step 505 after the value of the first holding flag Xho1 is set to "1" at Step 540, the CPU makes a "No" determination at Step 505, and proceeds to Step 545. At Step 545, the CPU determines whether or not the value of the first holding flag Xho1 is "1". The CPU makes a "Yes" determination at Step 545, and proceeds to Step 550.

At Step 550, the CPU determines whether or not the acceleration pedal operation amount AP is "0". When the acceleration pedal operation amount AP is larger than "0", the CPU makes a "No" determination at Step 550, and proceeds to Step 595 to tentatively terminate the present routine. As a result, the value of the prohibition flag Xkinshi remains at "1".

When the CPU proceeds to Step 550, the CPU makes a "Yes" determination at Step 550, and proceeds to Step 555, if the acceleration pedal operation amount AP is "0". At Step 555, the CPU sets the value of the first holding flag Xho1 to "0", and executes Steps 530 and 535.

Consequently, the CPU sets the value of the prohibition flag Xkinshi to "0" (Step 530), and executes the change notification (Step 535), at a time point that the acceleration pedal operation amount AP becomes "0" ("Yes" at Step 550) after the communication failure occurs in a situation in which the shift position SP is held at the reverse position R ("Yes" at Step 520) and the acceleration pedal operation amount AP is larger than "0" ("No" at Step 525).

When the CPU proceeds to Step 520, the CPU makes a "No" determination at Step 520, and executes Steps 560 and 565 in that order, if the shift position SP is not held at the reverse position R. Thereafter, the CPU proceeds to Step 595 to tentatively terminate the present routine.

Step 560: The CPU sets the value of the prohibition flag Xkinshi to "0".

Step 565: The CPU sets the value of the second holding flag Xho2 to "1".

When the CPU proceeds to Step 505 in the present routine after the CPU has set the value of the second holding flag Xho2 to "1", the CPU makes a "No" determination at Step 505, and proceeds to Step 545. The CPU makes a "No" determination at Step 545, and proceeds to Step 570, because the value of the first holding flag Xho1 is "0".

At Step 570, the CPU determines whether or not the shift position SP is held at the reverse position R. When the shift position SP is not held at the reverse position R, the CPU makes a "No" determination at Step 570, and proceeds to Step 595 to tentatively terminate the present routine.

Whereas, when the CPU proceeds to Step 570, the CPU makes a "Yes" at Step 570, and proceeds to Step 575, if the shift position SP is held at the reverse position R.

At Step 575, the CPU sets the value of the second holding flag Xho2 to "0", and proceeds to Step 535 to execute the change notification. Consequently, when the communication failure occurs in a situation in which the shift position SP is not held at the reverse position R ("No" at Step 520), the CPU sets the value of the prohibition flag Xkinshi to "0" (Step 560). Thereafter, when the shift position SP is changed to the reverse position R ("Yes" at Step 570), the CPU executes the change notification (Steps 575 and 535).

<Erroneous Operation (Stepping-On-Operation) Detection Routine>

Figure 6:
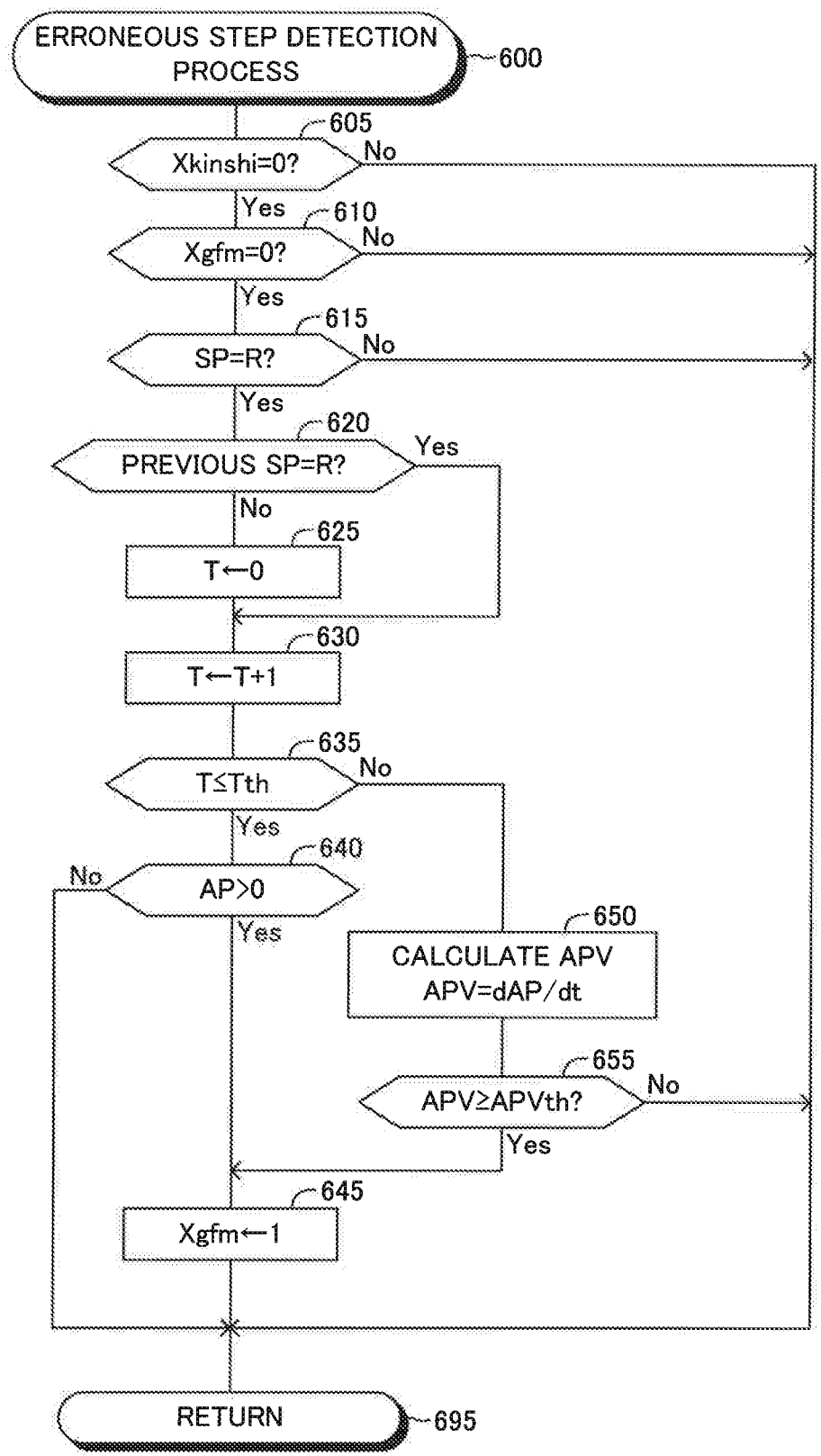
FIG. 6 is a flowchart illustrating a routine executed by the CPU of the driving support ECU illustrated in FIG. 1.

The CPU executes an erroneous operation detection routine (erroneous operation determination when reversing routine) represented by a flowchart shown in FIG. 6, every time a predetermined time elapses.

When a predetermined timing has come, the CPU starts processes from Step 600 shown in FIG. 6, and proceeds to Step 605 to determine whether or not the value of the prohibition flag Xkinshi is "0". When the value of the prohibition flag Xkinshi is "0", the CPU makes a "Yes" determination at Step 605, and proceeds to Step 610. At Step 610, the CPU determines whether or not the value of the erroneous operation flag Xgfm is "0". The value of the erroneous operation flag Xgfm is set to "1" when it is determined that the erroneous operation (that is, the erroneous operation while-reversing) has been performed. The value of the erroneous operation flag Xgfm is set to "0" when it is determined that the erroneous operation is ended (has disappeared). Furthermore, the value of the erroneous operation flag Xgfm is set to "0" through the above described initialization routine.

When the value of the erroneous flag Xgfm is "0", the CPU makes a "Yes" determination at Step 610, and proceeds to Step 615. At Step 615, the CPU determines whether or not the shift position SP is held at the reverse position R.

When the shift position SP is not held at the reverse position R, the CPU makes a "No" determination at Step 615, and proceeds to Step 695 to tentatively terminate the present routine. Thereafter, in a case where the driver operates the shift lever to change the shift position SP to the reverse position R, the CPU makes a "Yes" determination at Step 615, and proceeds to Step 620, when the CPU proceeds to Step 615.

At Step 620, the CPU determines whether or not the shift position SP was previously held at the reverse position R. When the previous shift position SP was not held at the reverse position R, in other words, when the present time point is immediately after a time point (hereinafter, referred to as "a reverse position change time point") that the shift position SP has changed to the reverse position R, the CPU makes a "No" determination at Step 620, and executes Steps 625 and 630 in that order. Thereafter, the CPU proceeds to Step 635.

Step 625: The CPU sets a value of a timer to "0" so as to initialize the timer T. The timer T is a timer to count/measure an elapsed time which is time that has elapsed from the reverse position change time point.

Step 630: The CPU adds "1" to the value of the timer T.

Step 635: The CPU determines whether or not the timer T is equal to or smaller than a threshold Tth indicating a predetermined time. That is, the CPU determines whether or not the present time point is within a determination time period from the reverse position change time point to a time point that the predetermined time (corresponding to the threshold Tth) elapses from the reverse position change time point.

When the timer T is equal to or smaller than the threshold Tth (that is, when the present time point is within the determination time period), the CPU makes a "Yes" determination at Step 635, and proceeds to Step 640. At Step 640, the CPU determines whether or not the acceleration operation amount AP is larger than "0".

When the acceleration pedal operation amount AP is "0", the CPU makes a "No" determination at Step 640, and proceeds to Step 695 to tentatively terminate the present routine.

Thereafter, when the present routine is executed and the CPU proceeds to Step 620 in the present routine executed afterward, the CPU makes a "Yes" determination at Step 620, and directly proceeds to Step 630 and Step 635. If the timer T is equal to smaller than the threshold Tth, the CPU makes a "Yes" determination at Step 635, and proceeds to Step 640.

When the acceleration pedal operation amount AP is larger than "0" at a time point that the CPU proceeds to Step 640, the CPU determines that the driver has stepped on (pressed) the acceleration pedal 22a in the determination time period so that the above described condition A1 becomes satisfied. In this case, the CPU makes a "Yes" determination at Step 640, and proceeds to Step 645 to set the value of the erroneous operation flag Xgfm to "1". Thereafter, the CPU proceeds to Step 695 to tentatively terminate the present routine.

Whereas, when the CPU proceeds to Step 635, the CPU makes a "No" determination at Step 635, if the state where the driver does not step on (press) the acceleration pedal 22a continues for a period equal to the determination time period. Thereafter, the CPU executes Step 650, and proceeds to Step 655.

Step 650: The CPU calculates the acceleration pedal operating speed APV.

More specifically, the CPU calculates a subtraction value dAP by subtracting the acceleration operation amount AP previously acquired (at the most recent time point) from the acceleration operation amount AP acquired at the present time point. Thereafter, the CPU acquires the acceleration pedal operating speed APV by dividing the subtraction value dAP by a time dt which is an execution interval of the present routine.

Step 655: The CPU determines whether or not the acceleration pedal operating speed APV is equal to or higher than the threshold operating speed APVth.

When the acceleration pedal operating speed APV is lower than the threshold operating speed APVth, the CPU makes a "No" determination at Step 655, and proceeds to Step 695 to tentatively terminate the present routine.

Whereas, when the acceleration operating speed APV is equal to or higher than the threshold operating speed APVth at Step 655, the above described condition A2 is satisfied. In this case, the CPU makes a "Yes" determination at Step 655, and proceeds to Step 645 to set the value of the erroneous operation flag Xgfm to "1". Thereafter, the CPU proceeds to Step 695 to tentatively terminate the present routine.

When the CPU proceeds to Step 610 in the present routine after the CPU has set the value of the erroneous operation flag Xgfm to "1", the CPU makes a "No" determination at Step 610, and proceeds to Step 695 to tentatively terminate the present routine. Accordingly, if the value of the erroneous operation flag Xgfm is "1", the CPU does not execute the present routine substantially.

When the CPU proceeds to Step 605 in the present routine after the CPU has determined that the communication failure has occurred to set the value of the failure flag Xijou to "1" at Step 425 shown in FIG. 4, the CPU makes a "No" determination at Step 605, Thereafter, the CPU proceeds to Step 695 to tentatively terminate the present routine. Consequently, if the value of the failure flag Xijou is "1", the CPU does not execute the present routine substantially.

<Erroneous Operation (Stepping-On-Operation) End Detection Routine>

Figure 7:
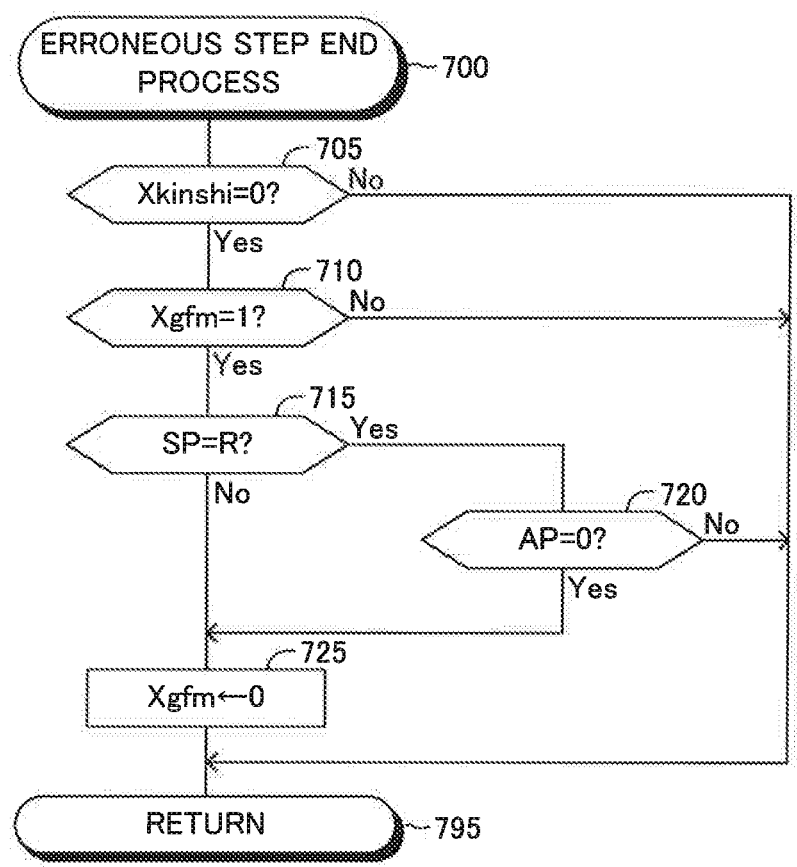
FIG. 7 is a flowchart illustrating a routine executed by the CPU of the driving support ECU illustrated in FIG. 1.

The CPU executes "an erroneous operation end routine (a determination routine for determining whether or not the erroneous operation while-reversing is ended (canceled))" represented by a flowchart shown in FIG. 7, every time a predetermined time elapses.

When a predetermined timing has come, the CPU starts processes from Step 700 shown in FIG. 7, and proceeds to Step 705 to determine whether or not the value of the prohibition flag Xkinshi is "0".

When the value of the prohibition flag Xkinshi is "0", the CPU makes a "Yes" determination at Step 705, and proceeds to Step 710. At Step 710, the CPU determines whether or not the value of the erroneous operation flag Xgfm is "1".

When the value of the erroneous operation flag Xgfm is "1", the CPU makes a "Yes" determination at Step 710, and proceeds to Step 715. At Step 715, the CPU determines whether or not the shift position SP is held at the reverse position R.

When the shift position SP is held at the reverse position R, the CPU makes a "Yes" determination at Step 715, and proceeds to Step 720. At Step 720, the CPU determines whether or not the acceleration pedal operation amount AP is "0".

When the acceleration pedal operation amount AP is larger than "0", the CPU makes a "No" determination at Step 720, and proceeds to Step 795 to tentatively terminate the present routine. In this case, the CPU determines that the erroneous operation (the erroneous operation while-reversing) is ended, because neither the above described condition B1 nor the above described condition B2 is satisfied. Consequently, the value of the erroneous operation flag Xgfm remains at "1".

Whereas, when the acceleration pedal operation amount is "0" at Step 720, the CPU determines that the erroneous operation while-reversing has been ended since the above described condition B2 is satisfied. Accordingly, the CPU makes a "Yes" determination at Step 720, and proceeds to Step 725 to set the value of the erroneous operation flag Xgfm to "0". Thereafter, the CPU proceeds to Step 795 to tentatively terminate the present routine.

Whereas, if the shift position SP is not held at the reverse position when the CPU proceeds to Step 715, the CPU determines that the erroneous operation while-reversing is ended, because the above described condition B1 becomes satisfied. Accordingly, the CPU makes a "No" determination at Step 715, and proceeds to Step 725 to set the value of the erroneous operation flag Xgfm to "0". Thereafter, the CPU proceeds to Step 795 to tentatively terminate the present routine.

When the CPU proceeds to Step 710, the CPU makes a "No" determination at Step 710, and proceeds to Step 795 to tentatively terminate the present routine, if the value of the erroneous operation flag Xgfm is "0".

When the CPU proceeds to Step 705, the CPU makes a "No" determination at Step 705, and proceeds to Step 795 to tentatively terminate the present routine, if the value of the prohibition flag Xkinshi is "1".

<Driving Force Control>

Figure 8:
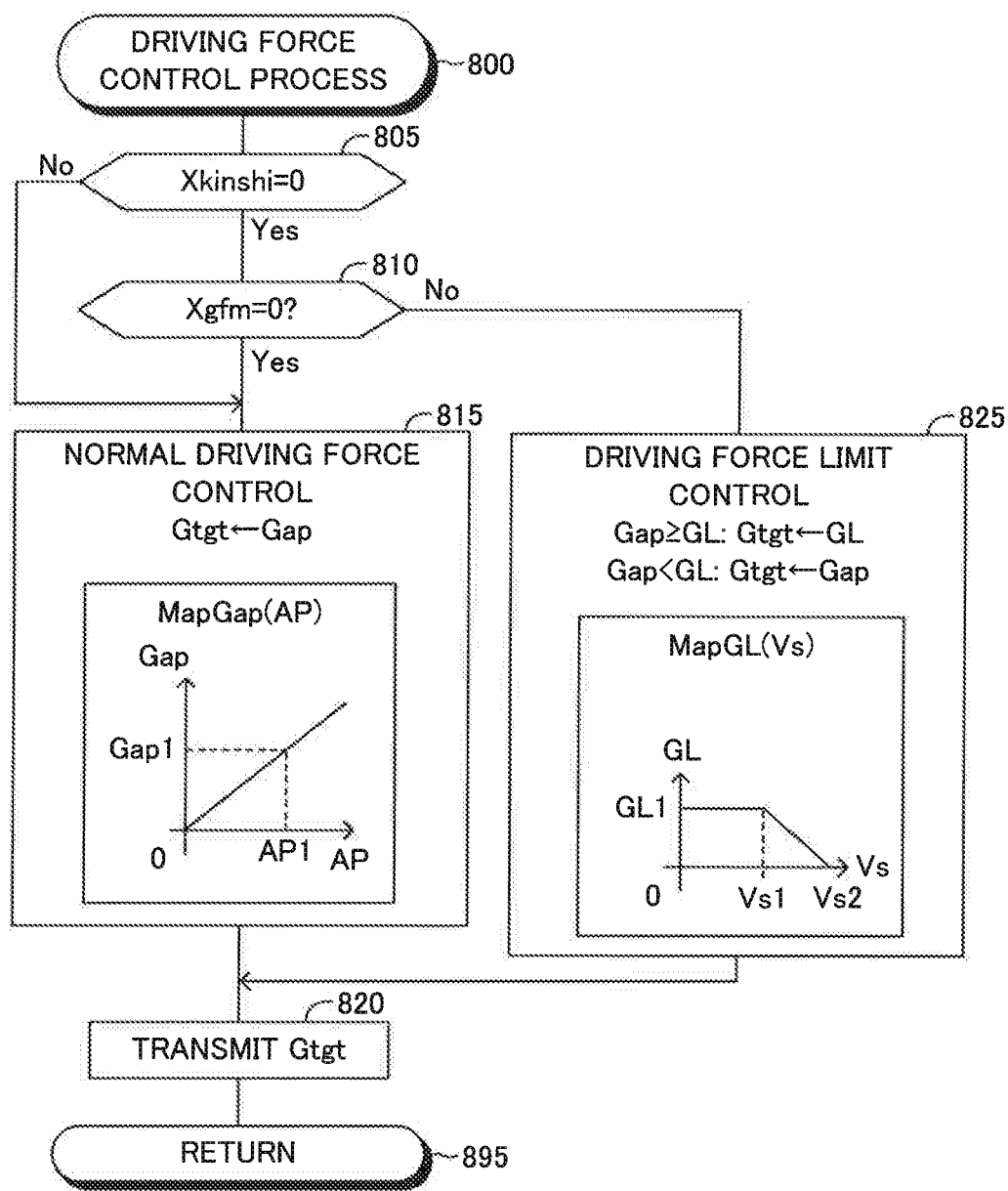
FIG. 8 is a flowchart illustrating a routine executed by the CPU of the driving support ECU illustrated in FIG. 1.

The CPU executes a driving force control routine represented by a flowchart shown in FIG. 8, every time a predetermined time elapses.

When a predetermined timing has come, the CPU starts processes from Step 800 shown in FIG. 8, and proceeds to Step 805 to determine whether or not the value of the prohibition flag Xkinshi is "0".

When the prohibition flag Xkinshi is "0", the CPU makes a "Yes" determination at Step 805, and proceeds to Step 810. At Step 810, the CPU determines whether or not the value of the erroneous operation flag Xgfm is "0".

When the value of the erroneous operation flag Xgfm is "0", the CPU makes a "Yes" determination at Step 810, and executes Steps 815 and 820 in that order. Thereafter, the CPU proceeds to Step 895 to tentatively terminate the present routine.

Step 815: The CPU executes the normal driving force control.

More specifically, the CPU acquires the operation acceleration Gap by applying the acceleration pedal operation amount AP to the above described normal acceleration map MapGap(AP), so as to set the target acceleration Gtgt to the operation acceleration Gap.

Step 820: The CPU transmits the target acceleration Gtgt to the engine ECU 20. As described above, the engine ECU 20 adjusts (increases or decreases) the target throttle valve opening degree TAtgt in such a manner that the actual acceleration Ga becomes equal to the target acceleration Gtgt.

Whereas, when the CPU proceeds to Step 810, the CPU makes a "No" determination at Step 810, and executes Step 825 described below, if the value of the erroneous operation flag Xgfm is "1". Thereafter, the CPU proceeds to Step 820.

At Step 825, the CPU executes the driving force limit control (the upper limit control).

More specifically, the CPU acquires the limit acceleration GL by applying the vehicle speed Vs to the above described limit acceleration map MapGL(Vs), and acquires the operation acceleration Gap by applying the acceleration pedal operation amount AP to the normal acceleration map Map-Gap(AP). Thereafter, when the operation acceleration Gap is equal to or larger than the limit acceleration GL, the CPU sets the target acceleration Gtgt to the limit acceleration GL. Whereas, when the operation acceleration Gap is smaller than the limit acceleration GL, the CPU sets the target acceleration to the operation acceleration Gap.

Thereafter, at Step 820, the CPU transmits the target acceleration Gtgt which the CPU sets at Step 825 to the engine ECU 20. As described above, the engine ECU 20 adjusts (increases or decreases) the target throttle valve opening degree TAtgt in such a manner that the actual acceleration Ga becomes equal to the target acceleration Gtgt.

When the CPU proceeds to Step 805, the CPU makes a "No" determination at Step 805, and proceeds to Step 815 without proceeding to Step 810, if the prohibition flag Xkinshi is "1" at Step 805. Thus, if the prohibition flag Xkinshi is "1", the CPU does not execute the driving force limit control, because the CPU proceeds to Step 815 to execute the normal driving force control regardless of the value of the erroneous operation flag Xgfm.

As described above, at an appropriate time point after the time point (the failure occurring time point) at which "the communication failure between the DSECU 10 and the main switch 14" has occurred, the DSECU 10 is forced/configured to set/change the value of the prohibition flag Xkinshi to "0". Even if the driver operates the main switch 14 after the failure occurring time point, the CPU cannot set the value of the prohibition flag to "1", since the CPU (DSECU 10) cannot receive the allowing request signal from the main switch 14. However, in the present disclosure, even if the DSECU 10 does not receive the allowing request signal from the main switch 14, the DSECU 10 sets the value of the prohibition flag Xkinshi to "0" at the appropriate time point after the failure occurring time point. Accordingly, when the driver performs the erroneous operation (that is, the erroneous operation while-reversing) on the acceleration pedal 22a after the failure occurring time point, the limit control (the driving force limit control) can be executed certainly.

The present disclosure is not limited to the above described embodiment, and can employ various modifications within a scope of the present disclosure.

The detection method for detecting the communication failure is not limited to the above described method, and can be various methods.

For example, in a first modification, the DSECU 10 is configured to transmit an Ack request signal to the main switch 14, every time a predetermined time elapses. The main switch 14 is configured to transmit an Ack signal to the DSECU 10 when the main switch 14 receives the Ack request signal. The DSECU 10 determines that the communication failure has occurred, and sets the value of the failure flag Xijou to "1", when "a non-receiving state in which the DSECU 10 does not receive the Ack signal" continues for a time longer than a predetermined time which is longer than a transmitting interval of the Ack request signal.

Alternatively, in a second modification, the main switch 14 may be configured to transmit either the allowing request signal or the prohibition request signal according to a predetermined communication protocol, and the DSECU 10 may be configured to determine whether a signal transmitted from the main switch 14 is the allowing request signal or the prohibition request signal according to that predetermined communication protocol. In this case, the DSECU 10 determines that the communication failure has occurred to set the value of the failure flag Xijou to "1", when it is determined that "a state in which the signal transmitted from the main switch 14 is not following the predetermined communication protocol" continues for a time longer than a predetermined time.

Furthermore, in a third modification, in a case where the main switch is connected to the DSECU 10 via an other ECU, the other ECU is configured to detect the communication failure using any one of the above described methods, and to transmit, to the DSECU 10, a failure signal indicating that the communication failure has been occurring when the other ECU has detected the communication failure. When the DSECU 10 receives the failure signal from the other ECU, the DSECU 10 determines that the communication failure has occurred, and sets the value of the failure flag Xijou to "1".

In the above described embodiment, the main switch 14 is generating the prohibiting signal (prohibition request signal) while the main switch 14 is being held at the on-position, and is generating the allowing signal (allowing request signal) while the main switch 14 is being held at the off-position.

However, for example, in a fourth modification, the main switch 14 may be configured to continue generating a request signal for a predetermined time from a time point at which the main switch 14 is operated (pressed). While the main switch 14 is not generating the request signal, the voltage Vm caused by the main switch 14 is "0". While the main switch 14 is generating the request signal, the voltage Vm is a predetermined voltage V3 which is equal to or higher than the first threshold voltage V1*th* and is lower than the third threshold voltage V3*th*.

When the main switch 14 starts generating the request signal (that is, in a case of "V1*th*≤Vm<V3*th*"), the DSECU 10 sets the value of the prohibition flag Xkinshi to "1" if the prohibition flag Xkinshi is "0". In contrast, when the main switch 14 starts generating the request signal, the DSECU 10 sets the value of the prohibition flag Xkinshi to "0" if the prohibition flag Xkinshi is "1". Whereas, in a case where the main switch 14 is not generating the request signal, the DSECU 10 remains the value of the prohibition flag Xkinshi as it is.

As described above, in the first modification, when the non-receiving state continues for the time longer than the predetermined time, the DSECU 10 may determine that the communication failure has occurred. In the second modification, when a state in which the request signal does not follow the predetermined communication protocol continues for the time longer than the predetermined time, the DSECU 10 may determine that the communication failure has occurred. Furthermore, In the third modification wherein the main switch 14 is connected to the DSECU 10 via the other ECU, the DSECU 10 may determine that the communication failure has occurred when the DSECU 10 receives the failure signal from the other ECU.

In the above embodiment, the main switch 14 is configured to be switched to either one of the on-position or the off-position by the driver's operation, but is not limited to this configuration. For example, the main switch 14 may comprise a prohibiting request button and an allowing request button. In this case, when the prohibiting request button was pressed/pushed last, the main switch 14 may continue generating the prohibiting signal until the allowing request button is pressed/pushed. When the allowing request button was pressed/pushed last, the main switch 14 may continue generating the allowing signal until the prohibiting request button is pressed/pushed.

In the above embodiment, the DSECU 10 is configured to transmit the target acceleration Gtgt to the engine ECU 20, not only when the DSECU 10 executes the normal driving force control but also when the DSECU 10 executes the driving force limit control. However, the DSECU 10 is not limited to this configuration. For example, the engine ECU 20 may be configured to acquire the operation acceleration Gap by applying the acceleration pedal operation amount AP to the normal acceleration map MapGap(AP), in place of the DSECU 10. The engine ECU 20 sets the target acceleration Gtgt to the limit acceleration GL when the operation acceleration Gap is equal to or larger than the limit acceleration GL transmitted from the DSECU 10. Whereas, the engine ECU 20 sets the target acceleration Gtgt to the operation acceleration Gap when the operation acceleration Gap is smaller than the limit acceleration GL transmitted from the DSECU 10.

In this case, the DSECU 10 transmits, as the limit acceleration GL, an extremely large value which the operation acceleration Gap never reach, when the DSECU 10 executes the normal driving force control at Step 815. Furthermore, the DSECU 10 acquires the limit acceleration GL by applying the vehicle speed Vs to the limit acceleration map MapGL(Vs), and transmits the limit acceleration GL to the engine ECU 10, when the DSECU 10 executes the driving force limit control at Step 825.

Alternatively, the DSECU 10 may transmit a signal requesting the engine ECU 20 to execute the normal driving force control to the engine ECU 20, when the DSECU 10 executes the normal driving force control at Step 815. Furthermore, the DSECU 10 may transmit a signal requesting the engine ECU 20 to execute the driving force limit control to the engine ECU 20, when the DSECU 20 executes the driving force control. In this case, the DSECU 10 does not proceed to Step 820, that is, Step 820 is omitted.

In this configuration, the engine ECU 20 may be configured to determine the target throttle valve opening degree TAtgt by applying the acceleration operation amount AP to a target throttle valve opening degree map MapTAtgt(AP). According to the map MapTAtgt(AP), the target throttle valve opening degree TAtgt is determined in such a manner that the target throttle valve opening degree TAtgt is larger as the acceleration operation amount AP is larger.

The engine ECU 20 may be configured to drive the throttle valve actuator in such a manner that the throttle valve opening degree becomes equal to the target throttle valve opening degree TAtgt, when the engine ECU 20 receives the signal requesting the engine ECU 20 to execute the normal driving force control from the DSECU 10. Whereas, the engine ECU 20 acquires the limit acceleration (the upper limit acceleration) GL by applying the vehicle speed Vs to the limit acceleration map MapGL(Vs), when the engine ECU 20 receives the signal requesting the engine ECU 20 to execute the driving force control from the DSECU 10. Thereafter, the engine ECU 20 drives the throttle valve actuator in such a manner that the throttle valve opening degree becomes equal to the target throttle valve opening degree TAtgt. In this case, if the actual acceleration Ga is larger than the limit acceleration GL, the engine ECU 20 decreases gradually the throttle valve opening degree so that the actual acceleration Ga becomes smaller so as not to exceed the limit acceleration GL.

In the above described embodiment, the drive device 30 is the internal combustion engine. However, the drive device 30 may be a motor, or a combination of the motor and the internal combustion engine. That is, the present disclosure may be applied to an electric motor vehicle, a hybrid vehicle, or the like.

When the vehicle VA is the electric motor vehicle or the hybrid vehicle, a target driving torque of the vehicle is determined based on the acceleration operation amount AP and the vehicle speed Vs, and the drive device is controlled in such a manner that the driving wheels generates a torque which is equal to the determined target driving torque. Accordingly, in the case where the vehicle is the electric motor vehicle or the hybrid vehicle, the DSECU 10 determines the limit acceleration GL based on the acceleration operation amount AP and the vehicle speed Vs, and controls the traveling state of the vehicle VA in such a manner that the actual acceleration Ga does not exceed the limit acceleration GL, when the DSECU 10 executes the driving force limit control.

The accelerator is not limited to the acceleration pedal 22a. For example, the accelerator may be an acceleration lever.

A Step 820 shown in FIG. 8, the DSECU 10 may be configured to transmit the target acceleration Gtgt to a brake device (not shown) and a brake ECU (not shown). In this case, the brake ECU may be configured to drive the brake device so as to apply a brake force to the wheels, if the actual acceleration Ga exceeds the target acceleration Gtgt when and after the throttle valve opening degree has become "0".

What is claimed is:

1. A driving support device comprises:
   an accelerator which a driver operates in order for the driver to accelerate a vehicle;
   a controller configured to execute an upper limit control to control the vehicle in such a manner that an actual acceleration of when the vehicle is being reversed does not exceed an upper limit acceleration during a time period from a time point that a predetermined start condition becomes satisfied to a time point that a predetermined end condition becomes satisfied,
      the start condition being a condition which becomes satisfied when the driver performs erroneous operation on the accelerator while a shift position is being held at a reverse position so that the vehicle is reversed,
      the end condition being a condition which becomes satisfied when the driver ends the erroneous operation on the accelerator; and
   an operation switch configured to transmit a request signal to the controller when the driver operates the operation switch,
   wherein, the controller is configured to:
   set a state of the controller to a prohibiting state in which an execution of the upper limit control is prohibited, when the controller receives the request signal while the controller is in an allowing state in which the execution of the upper limit control is allowed;
   set the state of the controller to the allowing state when the controller receives the request signal while the controller is in the prohibiting state; and
   set the state of the controller to the allowing state when a failure that the controller cannot receive the request signal occurs.

2. The driving support device according to claim 1, wherein,
   when the failure occurs while the shift position is being held at the reverse position and the driver is operating the accelerator, the controller is configured to set the state of the controller to the allowing state at a time point that the driver ends operating the accelerator, without setting the state of the controller to the allowing state at a time point that the failure occurs.

3. The driving support device according to claim 1, wherein,
   the controller is configured to notify the driver of a change of the state of the controller from the prohibiting state to the allowing state, when the controller sets the state of the controller to the allowing state due to an occurrence of the failure.

4. The driving support device according to claim 3, wherein,
   when the failure occurs while the shift position is being held at a position other than the reverse position, the controller is configured to:
   set the state of the controller to the allowing state at a time point that the failure occurs; and
   notify the driver of the change of the state of the controller from the prohibiting state to the allowing state at a time point that the shift position is changed to the reverse position after the controller sets the state of the controller to the allowing state.

5. The driving support device according to claim 1, wherein,
   the controller is configured to determine that the start condition becomes satisfied when the driver starts operating the accelerator during a determination time period from a start time point to an end time point,
   the start time point is a time point that the shift position is changed to the reverse position from a position other than the reverse position, and
   the end time point is a time point that a predetermined time elapses from the start time point.

6. The driving support device according to claim 5, wherein,
   the controller is configured to determine that the end condition becomes satisfied when either one of a first condition and a second condition becomes satisfied,
   the first condition being a condition which becomes satisfied when the shift position is changed from the reverse position to the shift position other than the reverse position, and
   the second condition being a condition which becomes satisfied when the driver ends operating the accelerator.

7. The driving support device according to claim 1, wherein,
   the controller is configured to determine that the start condition becomes satisfied when an operating speed of the accelerator becomes equal to or higher than a predetermined threshold speed.

* * * * *